(12) United States Patent
Xiong et al.

(10) Patent No.: US 10,061,841 B2
(45) Date of Patent: Aug. 28, 2018

(54) FAST PATH TRAVERSAL IN A RELATIONAL DATABASE-BASED GRAPH STRUCTURE

(71) Applicant: International Business Machines Corporation, Armonk, NY (US)

(72) Inventors: Jinjun Xiong, White Plains, NY (US); Vladimir Zolotov, Putnam Valley, NY (US)

(73) Assignee: International Business Machines Corporation, Armonk, NY (US)

(*) Notice: Subject to any disclaimer, the term of this patent is extended or adjusted under 35 U.S.C. 154(b) by 303 days.

(21) Appl. No.: 14/919,183

(22) Filed: Oct. 21, 2015

(65) Prior Publication Data
US 2017/0116315 A1 Apr. 27, 2017

(51) Int. Cl.
*G06F 17/30* (2006.01)

(52) U.S. Cl.
CPC .. *G06F 17/30598* (2013.01); *G06F 17/30321* (2013.01); *G06F 17/30339* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,353,898 B1* | 3/2002 | Wipfel | .......... | G06F 11/008 707/999.01 |
| 2004/0177084 A1* | 9/2004 | Agrawal | .......... | G06F 17/30418 |
| 2007/0112730 A1* | 5/2007 | Gulli | .......... | G06F 17/30864 |
| 2009/0259652 A1* | 10/2009 | Yamane | .......... | G06F 17/30958 |
| 2011/0131244 A1* | 6/2011 | Padovitz | .......... | G06F 17/3071 707/776 |
| 2011/0265055 A1* | 10/2011 | Gray | .......... | G06F 17/5068 716/119 |
| 2013/0346411 A1* | 12/2013 | Fan | .......... | G11B 27/32 707/737 |
| 2014/0002483 A1* | 1/2014 | Hong | .......... | G06T 11/206 345/619 |
| 2014/0082024 A1* | 3/2014 | Cao | .......... | G06F 17/30601 707/802 |
| 2014/0219209 A1* | 8/2014 | Soneda | .......... | H04W 40/30 370/329 |
| 2014/0250140 A1* | 9/2014 | Guzenda | .......... | G06F 17/30958 707/758 |
| 2014/0337373 A1 | 11/2014 | Morsi et al. | | |
| 2015/0081739 A1 | 3/2015 | Xu | | |
| 2015/0081741 A1 | 3/2015 | Xu | | |
| 2015/0120775 A1 | 4/2015 | Shao et al. | | |

* cited by examiner

*Primary Examiner* — Etienne Leroux
(74) *Attorney, Agent, or Firm* — Rabin Bhattacharya

(57) ABSTRACT

A first plurality of relational tables is obtained from a relational database. Each table of the first plurality of relational tables stores connectivity information for a graph that comprises a plurality of nodes and a plurality of edges connecting the nodes, and each of the nodes is assigned an initial identifier. The nodes are clustered into a plurality of clusters. Each cluster contains a subset of the nodes, and all nodes in each subset are close to each other according to a metric. Each node is assigned a new identifier. The new identifier comprises a concatenation of an identifier associated with the cluster to which the node belongs and an identifier associated with the node. A second plurality of relational tables is constructed and stores connectivity information for the graph. The node is identified in the second plurality of relational tables by the new identifier.

20 Claims, 5 Drawing Sheets

FAST PATH TRAVERSAL IN A RELATIONAL DATABASE-BASED GRAPH STRUCTURE

BACKGROUND OF THE INVENTION

Many modern applications store critical data, such as data relating to financial transactions, telephone records, and customer billing, that can be mined for various purposes. These purposes can range from the detection of fraud and money laundering to the tracing of crimes and the targeting of advertisements and promotions.

Often, this data is stored in a relational database, i.e., a digital database that is organized based on the relational model of the data, such as a structured query language (SQL) database. The relational model typically organizes the data in a plurality of tables, where each table is associated with a different entity type described in the database. The rows of the table represent the instances of the entity type, while the columns of the table represent values assigned to the instances. In addition, each row is associated with a unique key that allows the row to be linked to rows in other tables.

SUMMARY OF THE INVENTION

In one embodiment, a computer-implemented method includes obtaining a first plurality of relational tables from a relational database, wherein each table of the first plurality of relational tables stores connectivity information for a graph that comprises a plurality of nodes and a plurality of edges connecting the plurality of nodes, and wherein each node of the plurality of nodes is assigned an initial identifier, clustering the plurality of nodes into a plurality of clusters, wherein each cluster of the plurality of clusters contains a subset of the plurality of nodes, and wherein all nodes in each subset of the plurality of nodes are close to each other according to a metric, assigning to each node in the plurality of nodes a new identifier, wherein the new identifier comprises a concatenation of an identifier associated with one of the plurality of clusters to which the each node belongs and an identifier associated with the each node, and constructing a second plurality of relational tables, wherein each table of the second plurality of relational tables stores connectivity information for the graph, and wherein the each node is identified in the second plurality of relational tables by the new identifier.

In another embodiment, a machine-readable storage medium encoded with instructions executable by a processor. The instructions cause the processor to perform operations including obtaining a first plurality of relational tables from a relational database, wherein each table of the first plurality of relational tables stores connectivity information for a graph that comprises a plurality of nodes and a plurality of edges connecting the plurality of nodes, and wherein each node of the plurality of nodes is assigned an initial identifier, clustering the plurality of nodes into a plurality of clusters, wherein each cluster of the plurality of clusters contains a subset of the plurality of nodes, and wherein all nodes in each subset of the plurality of nodes are close to each other according to a metric, assigning to each node in the plurality of nodes a new identifier, wherein the new identifier comprises a concatenation of an identifier associated with one of the plurality of clusters to which the each node belongs and an identifier associated with the each node, and constructing a second plurality of relational tables, wherein each table of the second plurality of relational tables stores connectivity information for the graph, and wherein the each node is identified in the second plurality of relational tables by the new identifier.

In another embodiment, a computer-implemented method includes obtaining a first set of nodes of a graph, wherein each node in the first set of nodes is identified by an initial identifier, for each node in the first set of nodes, obtaining an identifier of a cluster of nodes to which the each node belongs, wherein the identifier of the cluster is obtained by consulting a connectivity table, and constructing, for the each node, a new identifier that is a concatenation of the initial identifier identifying the each node and the identifier of the cluster.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
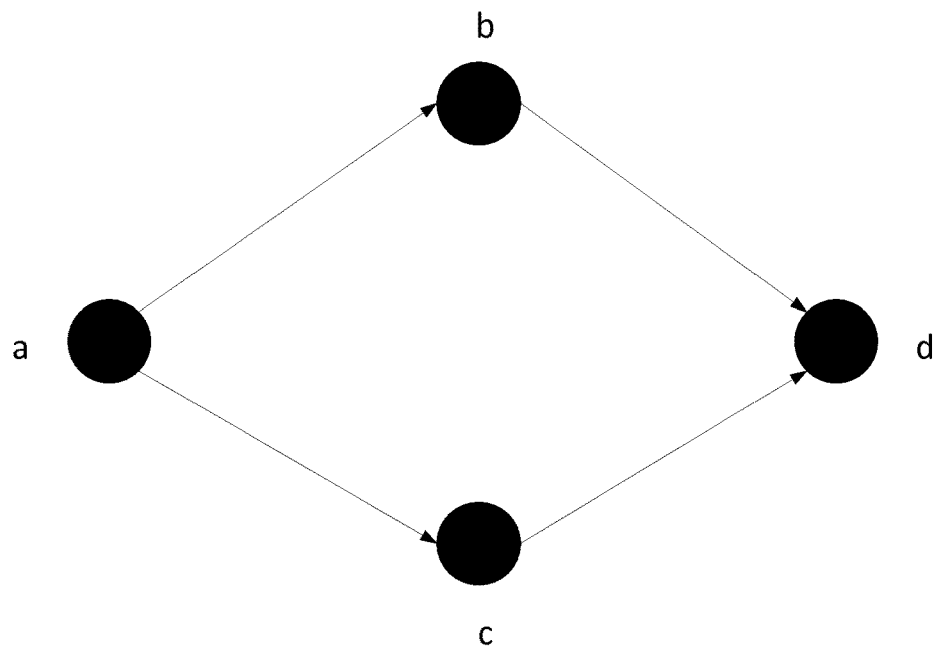
FIGS. 1A and 1B illustrate example graphs which may be considered abstractions of data contained in a relational database

In one embodiment, a method, machine readable storage medium, and apparatus for fast path traversal in a relational database-based graph structure is disclosed. As discussed above, a large number of organizations store critical data in traditional relational databases; thus, it makes sense for data mining applications to operate on the relational databases for data retrieval. However, many data mining applications rely on graph-related algorithms that abstract the data in the relational database into a graph form comprising a plurality of nodes and edges, where an edge between two nodes indicates a relationship or connectivity between the two nodes. The edge can be directed or undirected. For instance, a pair of nodes might represent two people, while an edge connecting the nodes represents a telephone call between the two people. Alternatively, a pair of nodes might represent two bank accounts, while an edge connecting the nodes represents a transfer of money between the two bank accounts.

Traversing such a graph in a relational database is not always a computationally simple or straightforward task. For instance, an application may seek to find all paths in a database between nodes A and B with lengths no longer than L. If the volume of data in the database is large, however, the probability of neighboring graph nodes residing in the same data block in memory (e.g., on disk) is very low. Thus, the number of data blocks that must be read in order to traverse the graph may be as numerous as the number of nodes traversed, which can number in the hundreds of thousands for a path length as small as ten nodes. Moreover, many of the nodes traversed do not belong to the paths of interest, and those nodes are traversed only in order to figure out the desired paths. Therefore, a path traversal algorithm may have to visit a very large number of nodes—and load potentially the same number of data blocks—in order to find the desired paths, even if the actual number of nodes belonging to the desired paths is much smaller than the number of nodes visited.

Embodiments of the invention facilitate graph-based traversal of relational databases by using the existing capabilities of a relational database management system (RDBMS) to construct tables and indices that improve graph traversal efficiency. In particular, graph traversal is performed using the newly created indices, which group nodes that are close to each other based on a metric (e.g., within a threshold distance), thereby reducing the number of data blocks that must be loaded to memory to perform the traversal and speeding total traversal time. Embodiments of the invention may facilitate data mining and other machine learning applications including the detection of fraud and money laundering, the tracing of crimes, and other applications. For instance, an application could mine the data in order to determine what a typical transaction path among certain individuals or bank accounts looks like. This, in turn, would allow the application to better detect when an abnormal transaction, which could be indicative of fraud, occurs. Alternatively, an application could mine the data in order to determine what the typical telephone call paths of an individual arrested for a crime look like. This, in turn, would allow the application to better detect unusual telephone call paths, which could involve the organizer or other participants in the crime.

Figure 1B:
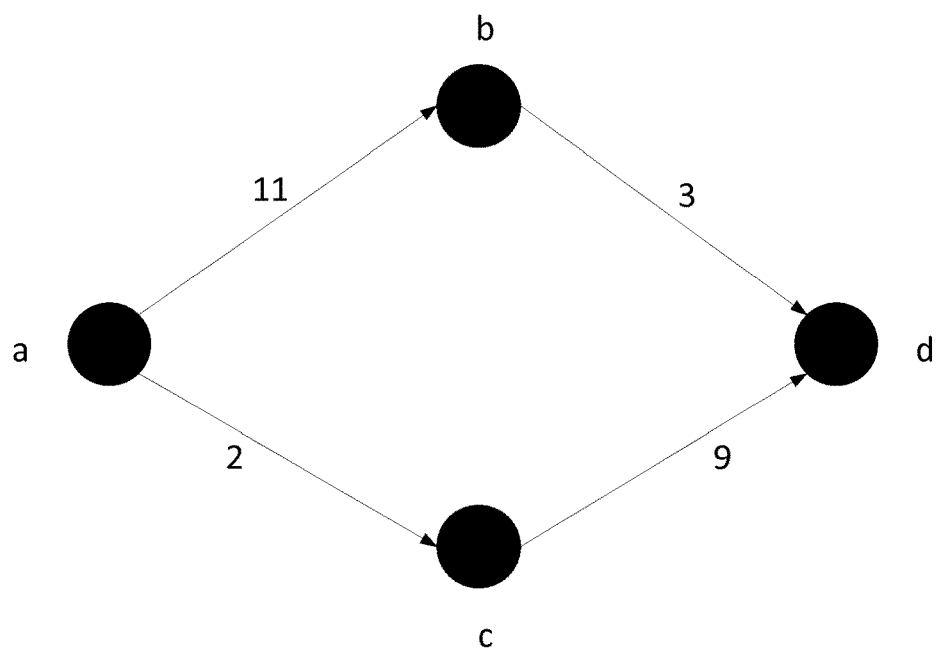

FIGS. 1A and 1B illustrate example graphs which may be considered abstractions of data contained in a relational database. As illustrated, each graph comprises a plurality of nodes a-d. In addition, a plurality of edges connect the nodes a-d. In one example, the nodes a-d may represent people, while the edges may represent phone calls made between the people (e.g., a phone call from a to b). Although the edges are illustrated in FIGS. 1A and 1B as being directed, the edges may alternatively be undirected.

FIG. 1A in particular is an unweighted graph. In this case, all of the edges connecting the nodes a-d have no weights, or can be considered to have the same weight (e.g., one). The distance between two nodes is computed as the length of the shortest path between the nodes. In the case of an unweighted graph, the shortest path is stated in terms of the number of edges traversed. For instance, in FIG. 1A, the shortest path from node a to node d is two, i.e., one edge from node a to node b or node c plus one edge from node b or node c to node d.

FIG. 1B, by contrast, is a weighted graph. In this case, the edges may have different weights. The weights may correspond, for example, to the lengths of the respective edges. The distance between two nodes is again computed as the length of the shortest path between the nodes. However, in the case of a weighted graph, the shortest path is stated in terms of the sum of the weights of all of the edges traversed. For instance, in FIG. 1B, the shortest path from node a to node d is eleven, i.e., the sum of the weights of the edges connecting node a and node c (two) and connecting node c and node d (nine).

The graphs depicted in FIGS. 1A and 1B are simplified in order to more clearly illustrate concepts related to the present disclosure. A graphical representation of the data contained in an actual relational database may include many more nodes and many more edges than what is depicted in FIGS. 1A and 1B. However, an understanding of the differences between weighted and unweighted graphs will make certain advantages of the present disclosure, which supports traversal of both weighted and unweighted graphs, more readily apparent.

Figure 2:
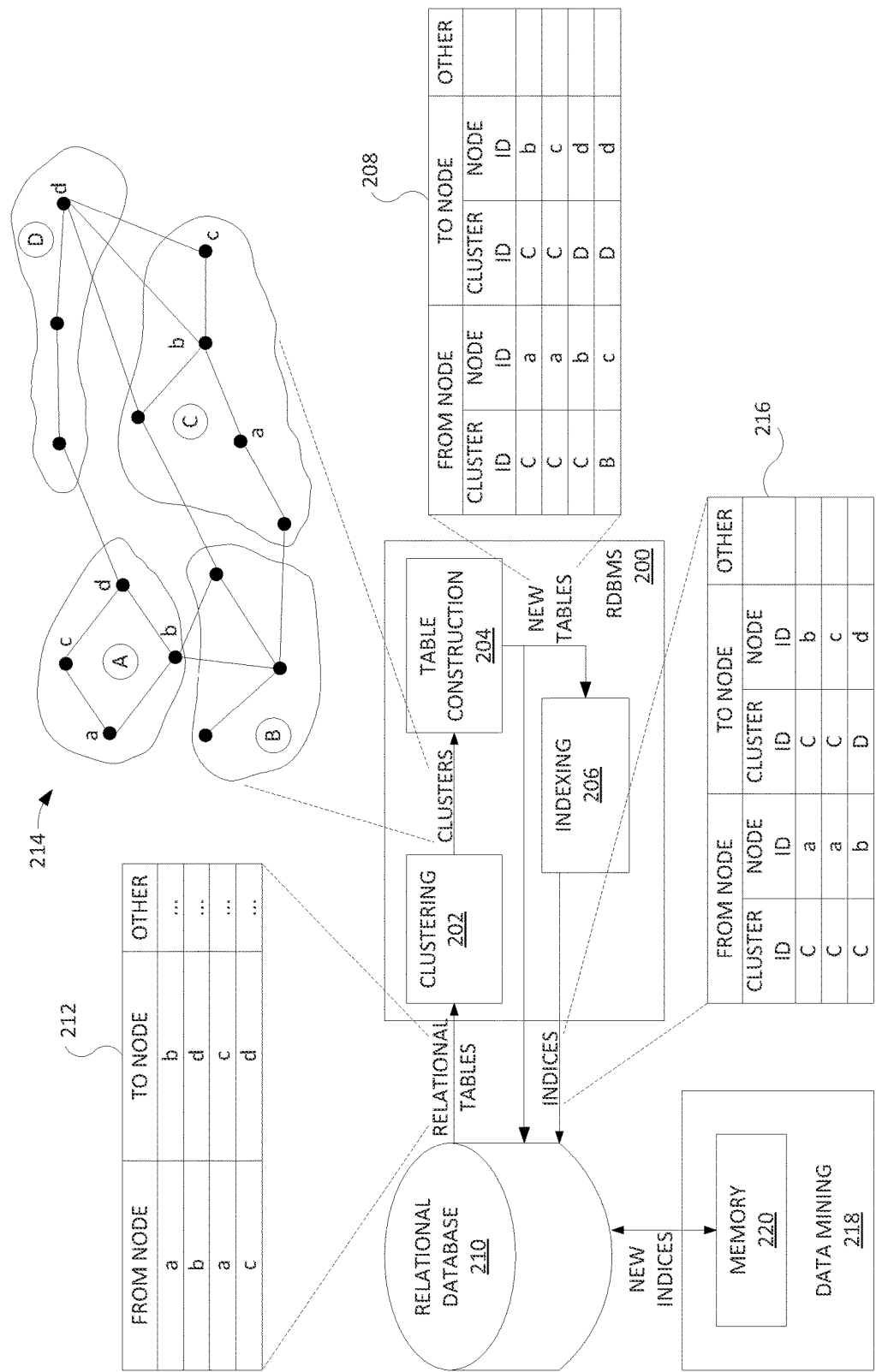
FIG. 2 is a block diagram illustrating one embodiment of a relational database management system.

FIG. 2 is a block diagram illustrating one embodiment of a relational database management system (RDBMS) 200, according to the present disclosure. As illustrated, the RDBMS 200 generally comprises a clustering engine 202, a table construction engine 204, and an indexing engine 206.

The clustering engine 202 is in communication (e.g., over a network) with a relational database 210. The relational database 210 stores data based on the relational model of the data. To this end, the relational database 210 stores the data in a plurality of tables, such as the table 212. Each table is associated with a different entity type described in the database. The rows of the table represent the instances of the entity type, while the columns of the table represent values assigned to the instances. In addition, each row is associated with a unique key that allows the row to be linked to rows in other tables.

As an example, the table 212 may store graph connectivity information in the form of a (From, To) table with other relevant information. In particular, the example table 212 illustrated in FIG. 2 corresponds to the unweighted graph illustrated in FIG. 1A. In this case, each row of the table 212 represents a single transaction or communication (e.g. a single "edge" of the graph). Thus, the table 212 may comprise, for each transaction or communication, a column storing the identity (e.g., node ID) of a predecessor node from which the transaction or communication was received ("From Node"), a column storing the identity (e.g., node ID) of a successor node to which the transaction or communication was sent ("To Node"), and a column storing other information related to the transaction or communication. In a further embodiment where the table 212 corresponds instead to the weighted graph illustrated in FIG. 1B, the table 212 might include an additional column storing the weights of the edges connecting the "From Nodes" and "To Nodes" of each transaction or row. The data referenced by each row of the table 212 may be distributed across multiple different physical blocks in the relational database. Thus, when traversing a transaction or record, from starting node to ending node and including all intermediate nodes in between, conventional graph-based algorithms may require that a new block of data be read for each connection (e.g., each "edge" between nodes in the graph). The table 212 represents only one example of a relational database-based graph structure, and is not intended to be limiting. For instance, a table stored in a relational database may represent relationships other than From-To relationships.

The clustering engine 202 obtains data in the form of tables, such as the table 212, from the relational database 210. The clustering engine 202 then clusters the nodes in the data according to their connectivity, i.e., such that each cluster contains nodes that are close to each other according to some metric (e.g., within a threshold distance). The metric may be, for example, whether or not two nodes are connected, a frequency with which two nodes are connected, or a weight of a connection between two nodes, among other criteria by which a graph may be traversed. For instance, a set 214 of example clusters A-D are illustrated in FIG. 2. The nodes a-d indicated in the table 212 are represented in the set 214 of clusters. In particular, nodes a-c are contained within cluster C, while node d is contained within cluster D. In one embodiment, any one or more of a number of clustering techniques may be used by the clustering engine 202 to generate the clusters. However, the precise technique implemented for clustering may depend on whether the initial graphs are weighted or unweighted and/or on the weights of the edges (when the graphs are weighted).

For instance, in one embodiment, where a graph is unweighted, the nodes that are closest to each other (e.g., separated by no more than a threshold number of edges) may be grouped in the same cluster. In an alternative embodiment, where a graph is weighted, the nodes that are closest to each other (e.g., separated by no more than a threshold weighted distance/sum of edge weights) may be grouped in the same cluster. In this case, two nodes placed in the same cluster could have a relatively large number of edges between them; however, the sum of the weights of these edges may be less than the threshold.

In one embodiment, the size of each cluster is approximately equal to the size of a data block in the relational database 210. In a further embodiment, clusters may be organized in a hierarchical manner, i.e., where the nodes of the cluster are arranged in tiered or ordered manner.

The clustering engine 202 provides the clusters to the table construction engine 204. The table construction engine 204 generates a set of new data structures, based on the clusters and using the existing relational database capabilities. In one embodiment, the new data structures are new tables, where each new table corresponds to at least one of the clusters (e.g., one, multiple, or all of the clusters) and stores the data for the corresponding cluster(s). The table construction engine 204 may create these new tables from scratch or it may simply modify the existing tables (e.g., such as table 212) in order to include new information as described in greater detail below.

As an example, the new table 208 may store graph connectivity information in the form of a (From, To) table with other relevant information, similar to the table 212. In this case, each row of the new table 208 represents a single transaction or communication (e.g., a single "edge" of the example unweighted graph illustrated in FIG. 1A). Thus, the new table 208 may comprise, for each transaction or communication, a column storing the identity of a predecessor node from which the transaction or communication was received ("From Node"), a column storing the identity of a successor node to which the transaction or communication was sent ("To Node"), and a column storing other information related to the transaction or communication. If the original table 212 had included a column storing the weights of the edges, the new table 208 would also include a column storing the weights of the edges. However, unlike the table 212, the new table 208 additionally stores both a node ID and a cluster ID for each node. In one embodiment, the node ID for a node may be a unique ID across all nodes in the relational database 210 or a unique ID only across all nodes in the same cluster. Each node can thus be assigned a new unique node ID that is a concatenation of the node's cluster ID and node ID. For instance, in the example illustrated in FIG. 2, the node ID "a" in the original table 212 becomes the new unique node ID "Ca" in the new table 208. A similar new table can be constructed for traversing the transaction or communication in the opposite direction. The new table 208 represents only one example of a data structure that may be used to store data related to connected records, and is not intended to be limiting.

The indexing engine 206 receives the new tables, such as the new table 208, from the table construction engine 204. The indexing engine 206 creates an index for each of the new tables. In one embodiment, where the new table is a From-To table such as the new table 208, and where the original graph was unweighted, the index is created as a concatenation of the cluster ID of the From Node, the node ID of the From Node, the cluster ID of the To Node, and the node ID of the To Node. If the original graph was weighted, the index may further include the edge weight concatenated to the end.

The indices are stored in sorted order in the relational database 210. In one embodiment, the indices are sorted by storing index entries associated with From Nodes having the same cluster ID in the same physical block of data, as depicted by the example indices 216.

Thus, traversal of a graph can be performed by reading only the index records of the new tables, such as the new table 208. That is, requests for index records of nodes belonging to the same cluster will reduce or eliminate the need for the loading of additional blocks of data. For instance, if a data block is large enough to store one thousand new index records, then index records of a node with neighbors of degree three can be stored in the same data block. This improves the functioning of a computer performing graph traversal by reducing the number of memory reads that is needed to traverse the graph. In some cases, it may be necessary to access one or more additional data blocks if the index records of the neighboring nodes span more than one data block. However, even in these cases, the number of memory reads is greatly reduced.

The new tables, such as new table 208, and new index records, such as the index record 206, may be stored in the relational database 210. The new index records (and, optionally, new tables) may then be loaded from the relational database 210 into the memory 220 of a computer 218 programmed for performing data mining or other graph-based operations when a graph is being traversed. The memory 220 may be a local memory or a remote memory. In one embodiment, the storage size of the memory 220 is smaller than the storage size of the relational database 210. However, due to the smaller size of the new tables (i.e., relative to the full storage size of the relational database 210), it may be possible to load all of the index records of the new tables necessary to perform a full graph traversal in the memory 220.

Figure 3:
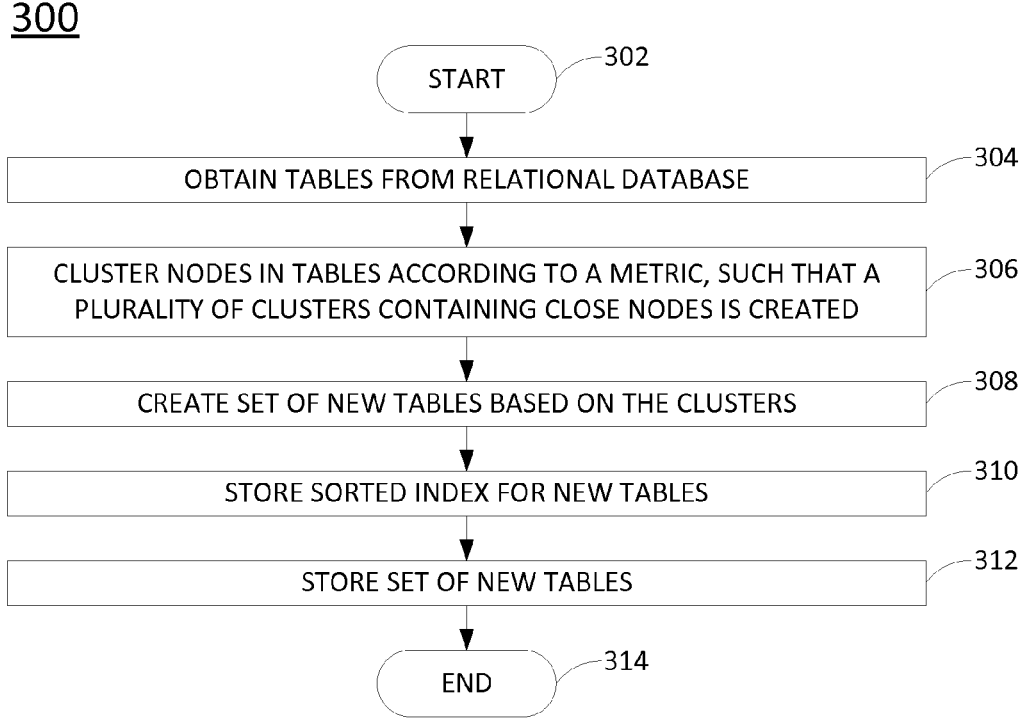
FIG. 3 is a flow diagram illustrating one example of a computer-implemented method for facilitating fast path traversal in a relational database-based graph structure.

FIG. 3 is a flow diagram illustrating one example of a computer-implemented method 300 for facilitating fast path traversal in a relational database-based graph structure. The method 300 may be carried out, for example, by various components of the system 200 illustrated in FIG. 2 and described in detail above, or by a general purpose computer that is programmed to function as special purpose computer, as discussed below in connection with FIG. 6. As an example, the method 300 is described as being performed by components of the system 200.

The method 300 begins in step 302. In step 304, the clustering engine 202 obtains a plurality of tables from the relational database 210. Each table is associated with a different entity type described in the database. The rows of the table represent the instances of the entity type, while the columns of the table represent values assigned to the instances. In addition, each row is associated with a unique key that allows the row to be linked to rows in other tables.

In step 306, the clustering engine 202 clusters the nodes in the tables according to their connectivity, i.e., such that each cluster contains nodes that are close to each other according to some metric (e.g., within a threshold distance). The metric may be, for example, whether or not two nodes are connected, a frequency with which two nodes are connected, or a weight of a connection between two nodes, among other criteria by which a graph may be traversed. In one embodiment, any one or more of a number of clustering techniques may be used in step 306 to generate the clusters. In one embodiment, clustering can be optimized based on observed query patterns (e.g., graph traversal patterns). As discussed above, the precise clustering technique used, or the clustering criteria used, may depend on whether the graphs to be traversed are weighted or unweighted, or whether the tables obtained in step 304 include edge weights.

In step 308, the table construction engine 204 constructs a new set of tables based on the clusters. In one embodiment, each of the new table corresponds to at least one of the clusters and stores the data for the corresponding cluster(s). In one embodiment, the creation of new tables can be optimized based on observed query patterns (e.g., graph traversal patterns).

In step 310, the indexing engine 206 stores a sorted index for the new tables. In one embodiment, where the graph to be traversed is unweighted, the index for a given record will be a concatenation of the From Node's cluster ID, the From Node's node ID, the To Node's cluster ID, and the To Node's node ID, per the new tables. In another embodiment, where the graph to be traversed is weighted, the index further includes the edge weight concatenated to the end.

In step 312, the new tables and indices are stored, e.g., in the relational database 210. The method 300 then ends in step 314.

The clusters and/or new tables may occasionally require incremental updates, or even a full rebuild, depending upon how frequently records are updated in the relational database 210. These updates can be performed online or offline with minimal impact to performance when traversing a graph. To further minimize the impact on performance, empty space can be reserved in the data blocks in advance when building the new tables to accommodate future incremental updates. Updates of graph connectivity may reduce the optimality of the assignment of nodes to clusters. In this case, the database management system (e.g., RDBMS 200) can modify the assignment of nodes to clusters using the updated connectivity information. For instance, nodes may be moved from one cluster to another cluster, new clusters may be created, and/or existing clusters may be deleted. To speed the update process, the index records (and, optionally, the new tables) can be reorganized so that the index records of nodes that are close to each other (e.g., within a threshold distance of each other) are placed in the same or neighboring data blocks. Reorganization of clusters, and corresponding reorganization of index records, can be performed either online during active operation of the relational database 210 or can be performed periodically offline.

Figure 4:
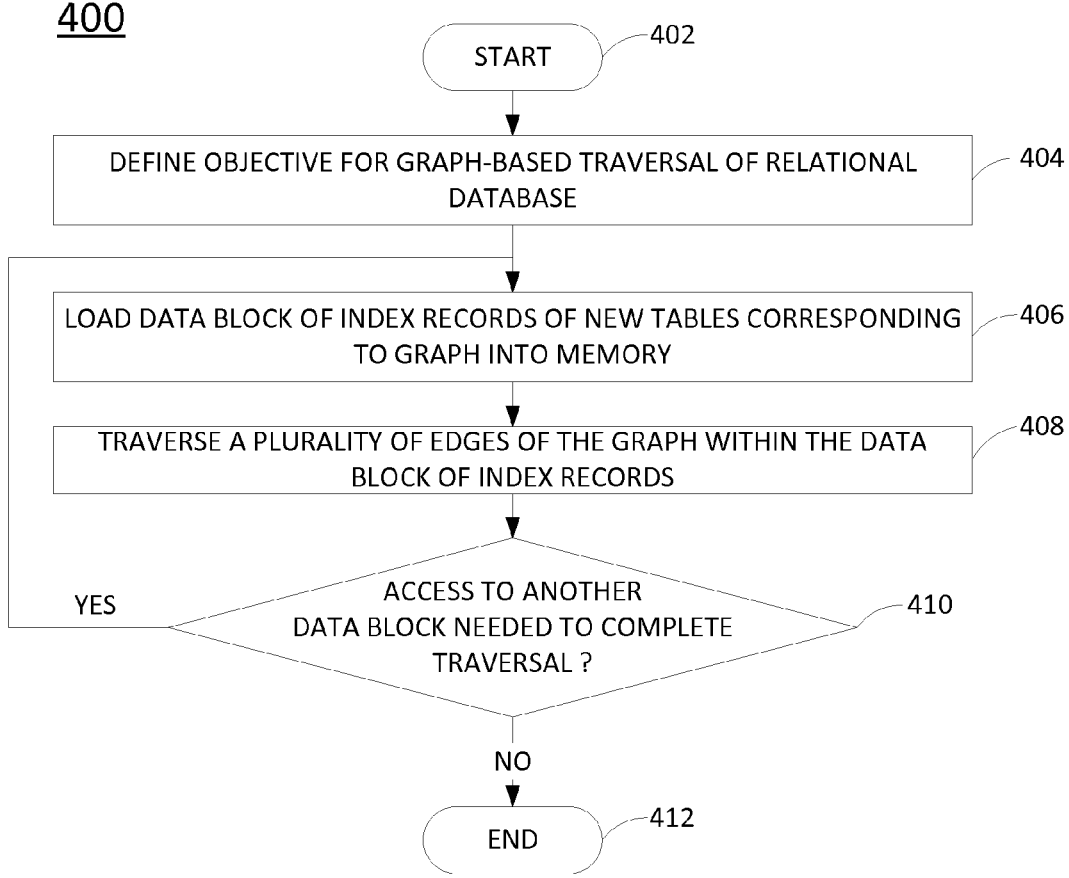
FIG. 4 is a flow diagram illustrating one example of a high-level computer-implemented method for fast path traversal in a relational database-based graph structure.

FIG. 4 is a flow diagram illustrating one example of a high-level computer-implemented method 400 for fast path traversal in a relational database-based graph structure. The method 400 may be carried out, for example, by the computer 218 of FIG. 2, or by a general purpose computer that is programmed to function as special purpose computer, as discussed below in connection with FIG. 6. As an example, the method 400 is described as being performed by the computer 218.

The method 400 begins in step 402. In step 404, the computer 218 defines an objective for a graph-based traversal of a relational database (e.g., relational database 210). For instance, the objective may be to find the shortest path between two nodes in the database (e.g., in terms of number of edges or sum of edge weights), to find all paths shorter than a maximum length between two nodes in the database, or finding a set of nodes connected to a given node by paths that contain no more than a maximum number of edges.

In step 406, the computer 218 loads a data block of index records of new tables from the relational database 210 into memory 220 (e.g., a local or remote memory associated with the computer 218).

In step 408, the computer 218 traverses a plurality of edges of the graph, all within the data block of index records that was loaded in step 406. Thus, in one embodiment, the plurality of edges are all traversed within a single data block.

In step 410, the computer 218 determines whether it is necessary to access another data block of index records to complete the traversal.

If the computer 218 concludes in step 410 that it is not necessary to access another data block of index records to complete the traversal (i.e., the traversal can be completed within the data block of index records loaded in step 406), then the method 400 ends in step 412.

Alternatively, if the computer 218 concludes in step 410 that it is necessary to access another data block of index records to complete the traversal (i.e., the traversal cannot be completed within the data block of index records loaded in step 406), then the method 400 returns to step 406 and loads another data block of index records of new tables from the relational database 210 into memory 220. The computer 218 may repeat steps 406-410 as necessary until the traversal is complete; however, it is expected that significantly fewer data blocks will need to be loaded from the relational database 210 into memory 220 than is typical when traversing a conventional relational database-based graph structure.

Figure 5:
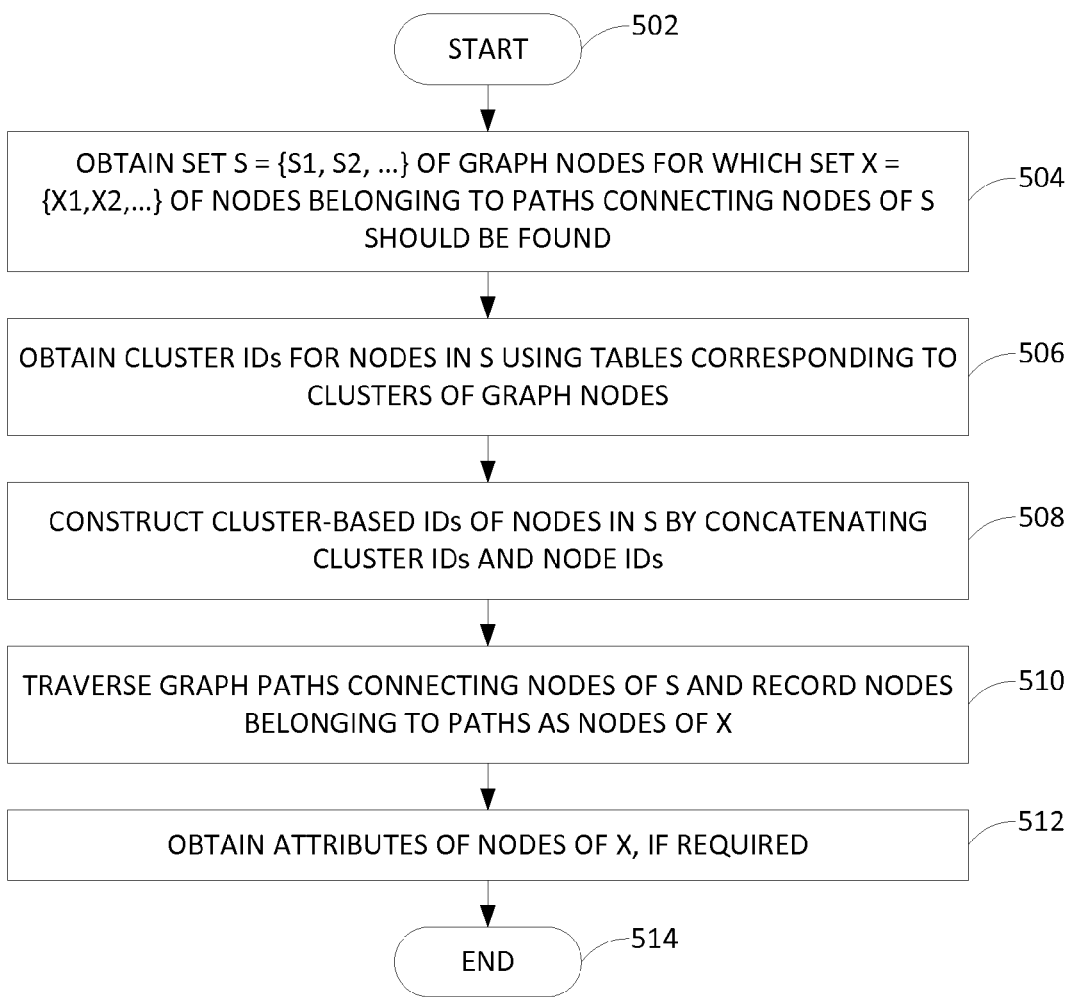
FIG. 5 is a flow diagram illustrating one example of a more detailed computer-implemented method for fast path traversal in a relational database-based graph structure.

FIG. 5 is a flow diagram illustrating one example of a more detailed computer-implemented method 500 for fast path traversal in a relational database-based graph structure. In particular, the method 500 presents a more detailed example of the method 400 illustrated in FIG. 4. The method 500 may be carried out, for example, by the computer 218 of FIG. 2, or by a general purpose computer that is programmed to function as special purpose computer, as discussed below in connection with FIG. 6. As an example, the method 500 is described as being performed by the computer 218.

The method 500 begins in step 502. In step 504, the computer 218 obtains a first set, S={s1, s2, . . . }, of graph nodes. In one embodiment, the graph nodes in the first set S are identified by their node IDs. A second set, X={x1, x2, . . . } of graph nodes belonging to the paths connecting the graphs nodes of the first set S is to be found, where X is a superset of S. In one embodiment, it is assumed that graph connectivity is defined in terms of a From-To relationship (e.g., as depicted in the relational table 212 in FIG. 2), that a cluster-based version of this connectivity is defined (e.g., as depicted in the relational table 208 in FIG. 2), and that a sorted index for the cluster-based version is defined.

In step 506, the computer 218 obtains the cluster IDs for the nodes in the first set S. In one embodiment, the computer 218 does this using one or more cluster-based connectivity tables, such as the relational table 208 of FIG. 2.

In step 508, the computer 218 constructs the cluster-based IDs (e.g., new unique node IDs) for the nodes in the first set S. In one embodiment, the computer 218 does this by concatenating each node's cluster ID and node ID (e.g., where the node ID is the ID identified in step 504).

In step 510, the computer 218 traverses the graph paths connecting the nodes in the first set S. During the traversal, the computer 218 records the nodes in the second set X belonging to the traversed graph paths. In one embodiment, a graph traversal algorithm is employed that uses only queries to the sorted index of the cluster-based version of the connectivity. In this case, a query for identifying all neighbors of traversed node xi of the second set X that belong to the cluster ci may be stated as, "Select all keys beginning with ci:xi from index." This query will return the cluster IDs and node IDs of neighbors of the node xi, as well as the weights of the edges connecting the node xi to its neighbors (if the graph is weighted).

In step 512, having identified the nodes in the second set X, the computer 218 may obtain any required attributes of the identified nodes, as specified by some objective (e.g., characteristics, properties, etc.).

The method 500 ends in step 514.

Thus, the system 200 and methods 300-500 may operate in conjunction to facilitate fast path traversal in a relational database-based graph structure. By creating a new index scheme for more closely connected nodes, the number of data blocks that must be loaded to memory to perform a graph-based traversal may be significantly reduced (e.g., to as few as one memory read) and total traversal time may be sped.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Examples of the present disclosure may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
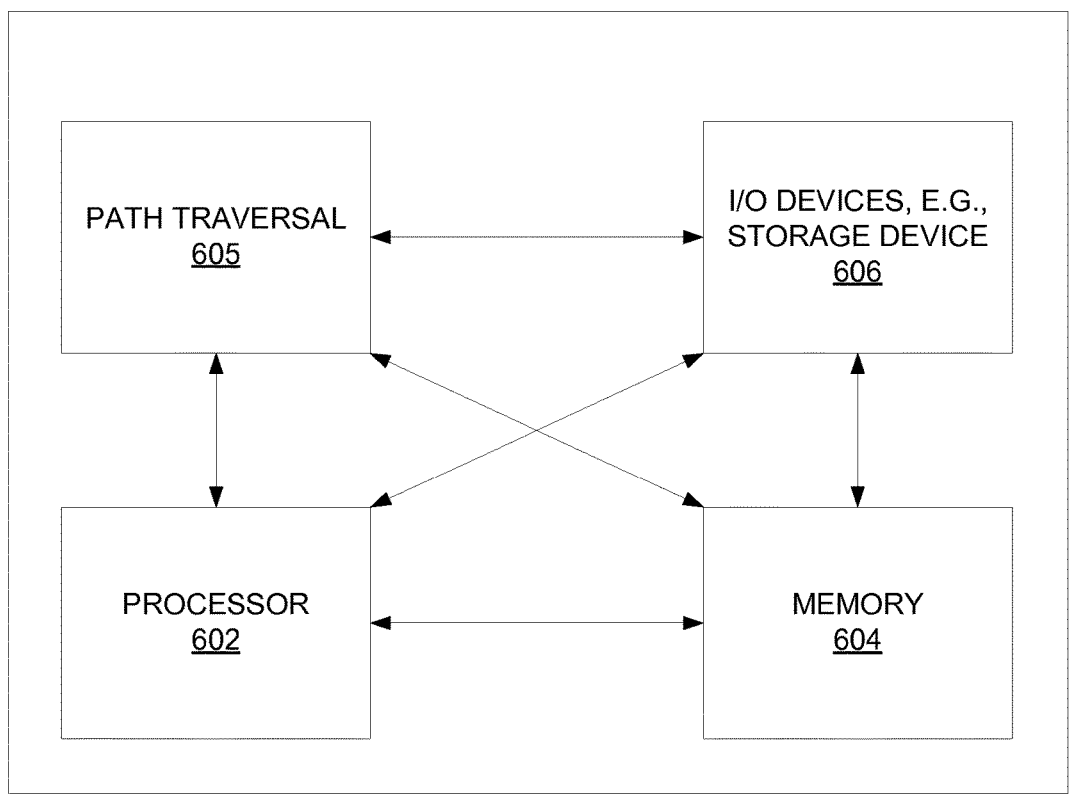
FIG. 6 depicts a high-level block diagram of a computer that can be transformed into a machine capable of performing the functions described herein.

FIG. 6, for example, depicts a high-level block diagram of a computer 600 that can be transformed into a machine capable of performing the functions described herein. The computer 600 may comprise, for example, part of the RDBMS 200 or computer 218 discussed above in connection with FIG. 2. Notably, no computer or machine currently exists that performs the functions as described herein. As a result, the examples of the present disclosure improve the operation and functioning of the general-purpose computer to traverse paths in a relational database-based graph structure, as disclosed herein.

As depicted in FIG. 6, the computer or system 600 comprises a hardware processor element 602 (e.g., a central processing unit (CPU), a microprocessor, or a multi-core processor), a memory 604, e.g., random access memory (RAM) and/or read only memory (ROM), a module 605 for path traversal, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the respective systems and/or methods discussed above can be used to configure a hardware processor to perform the steps functions and/or operations of the above disclosed systems and methods. In one embodiment, instructions and data for the present module or process 605 for fast path traversal in a relational database-based graph structure (e.g., a software program comprising computer-executable instructions) can be loaded into memory 604 and executed by hardware processor element 602 to implement the steps, functions or operations as discussed above in connection with the exemplary system 200 and/or methods 300-500. The processor executing the computer readable or software instructions relating to the above described method(s) can be perceived as a programmed processor or a specialized processor. As such, the present module 605 for path traversal (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    obtaining a first plurality of relational tables from a relational database, wherein each table of the first plurality of relational tables stores connectivity information for a graph that comprises a plurality of nodes and a plurality of edges connecting the plurality of nodes, wherein each node of the plurality of nodes represents a data item stored in the relational database, each edge represents a relationship between two data items represented by two nodes of the plurality of nodes, and wherein each node of the plurality of nodes is assigned an initial identifier;
    clustering the plurality of nodes into a plurality of clusters, wherein each cluster of the plurality of clusters contains a subset of the plurality of nodes, and wherein all nodes in each subset of the plurality of nodes are close to each other according to a metric;
    assigning to each node in the plurality of nodes a new identifier, wherein the new identifier comprises a concatenation of an identifier associated with one of the plurality of clusters to which the each node belongs and an identifier associated with the each node; and constructing a second plurality of relational tables, wherein each table of the second plurality of relational tables stores connectivity information for the graph, and wherein the each node is identified in the second plurality of relational tables by the new identifier, such that a number of data blocks that must be loaded to a computer memory to traverse a path through the graph is minimized by reading index records from a relational table of the second plurality of relational tables.

2. The computer-implemented method of claim 1, wherein each row of each relational table of the second plurality of relational tables comprises:

a new identifier associated with a predecessor node from which an edge of the plurality of edges originates, wherein the a new identifier associated with the predecessor node comprises a concatenation of an identifier associated with one of the plurality of clusters to which the predecessor node belongs and an identifier associated with the predecessor node; and a new identifier associated with a successor node at which the edge of the plurality of edges terminates, wherein the a new identifier associated with the successor node comprises a concatenation of an identifier associated with one of the plurality of clusters to which the successor node belongs and an identifier associated with the successor node.

3. The computer-implemented method of claim 2, further comprising:

creating an index for each relational table of the second plurality of relational tables, wherein the index comprises a concatenation of the new identifier associated with the predecessor node and the new identifier associated with the successor node.

4. The computer-implemented method of claim 3, wherein the index is organized so that at least some data blocks of index records contain empty space reserved for additions to the index records as a result of updates to the relational database.

5. The computer-implemented method of claim 3, wherein the relational database and the index are organized so that index records corresponding to those of the plurality of nodes that are within a threshold distance of each other are stored in a common data block in the relational database or in neighboring data blocks in the relational database.

6. The computer-implemented method of claim 3, wherein the index is sorted such that a given data block in memory contains entries for which associated predecessor nodes belong to a common cluster of the plurality of clusters.

7. The computer-implemented method of claim 2, wherein the subset of the plurality of nodes includes nodes that are separated from each other by no more than a threshold number of the plurality of edges.

8. The computer-implemented method of claim 2, wherein each row of each relational table of the second plurality of relational tables further comprises:

an edge weight associated with the edge of the plurality of edges.

9. The computer-implemented method of claim 8, further comprising:

creating an index for the relational table of the second plurality of relational tables, wherein each index comprises a concatenation of the new identifier associated with the predecessor node, the new identifier associated with the successor node, and the edge weight.

10. The computer-implemented method of claim 9, wherein the index is sorted such that a given data block in the relational database contains entries for which associated predecessor nodes belong to a common cluster of the plurality of clusters.

11. The computer-implemented method of claim 8, wherein the subset of the plurality of nodes includes nodes that are separated from each other by no more than a threshold sum of edge weights.

12. The computer-implemented method of claim 8, wherein the weight reflects a length of the edge of the plurality of edges.

13. The computer-implemented method of claim 1, wherein the identifier associated with the each node is unique across all of the plurality of nodes in the relational database.

14. The computer-implemented method of claim 1, wherein the identifier associated with the each node is unique across all of the subset of the plurality of nodes contained in the one of the plurality of clusters to which the each node belongs.

15. A machine-readable storage medium encoded with instructions executable by a processor, wherein the instructions cause the processor to perform operations comprising:

obtaining a first plurality of relational tables from a relational database, wherein each table of the first plurality of relational tables stores connectivity information for a graph that comprises a plurality of nodes and a plurality of edges connecting the plurality of nodes, wherein each node of the plurality of nodes represents a data item stored in the relational database, each edge represents a relationship between two data items represented by two nodes of the plurality of nodes, and wherein each node of the plurality of nodes is assigned an initial identifier;

clustering the plurality of nodes into a plurality of clusters, wherein each cluster of the plurality of clusters contains a subset of the plurality of nodes, and wherein all nodes in each subset of the plurality of nodes are close to each other according to a metric;

assigning to each node in the plurality of nodes a new identifier, wherein the new identifier comprises a concatenation of an identifier associated with one of the plurality of clusters to which the each node belongs and an identifier associated with the each node; and constructing a second plurality of relational tables, wherein each table of the second plurality of relational tables stores connectivity information for the graph, and wherein the each node is identified in the second plurality of relational tables by the new identifier, such that a number of data blocks that must be loaded to a computer memory to traverse a path through the graph is minimized by reading index records from a relational table of the second plurality of relational tables.

16. A computer-implemented method, comprising:

obtaining a first set of nodes of a graph, wherein each node in the first set of nodes represents a data item stored in a relational database, each edge of the graph represents a relationship between two data items represented by two nodes of the first set in nodes, and wherein each node in the first set of nodes is identified by an initial identifier;

for each node in the first set of nodes, obtaining an identifier of a cluster of nodes to which the each node belongs, wherein the identifier of the cluster is obtained by consulting a connectivity table;

constructing, for the each node, a new identifier that is a concatenation of the initial identifier identifying the each node and the identifier of the cluster; and traversing a path through the graph that connects two nodes in the first set of nodes, wherein the traversing is performed by reading index records from a relational table that identifies each node in the first plurality of nodes by its respective new identifier, and wherein the reading minimizes a number of data blocks that must be loaded to a computer memory to traverse the path.

17. The computer-implemented method of claim 16, further comprising:

recording a second set of nodes belonging to the path.

18. The computer-implemented method of claim 17, further comprising:

recording a weight assigned to each edge belonging to the path.

19. The computer-implemented method of claim 17, wherein the traversing comprises:

submitting a query to a sorted index of a relational table, wherein the relational table stores connectivity information for the graph, and wherein the each node is identified in the relational table by an identifier that is a concatenation of an identifier of a cluster of connected nodes to which the each node belongs and an identifier of the each node.

20. The computer-implemented method of claim 19, wherein the query seeks other nodes for which identifiers begin with the identifier of the cluster.

* * * * *